United States Patent
Ikeda et al.

(10) Patent No.: US 7,211,730 B2
(45) Date of Patent: *May 1, 2007

(54) CABLE OR THE LIKE PROTECTION AND GUIDE DEVICE

(75) Inventors: Masaaki Ikeda, Osaka (JP); Shoichiro Komiya, Osaka (JP); Takayuki Matsuda, Osaka (JP)

(73) Assignee: Tsubakimoto Chain Company, Osaka (JP)

( * ) Notice: Subject to any disclaimer, the term of this patent is extended or adjusted under 35 U.S.C. 154(b) by 318 days.

This patent is subject to a terminal disclaimer.

(21) Appl. No.: 10/705,038

(22) Filed: Nov. 10, 2003

(65) Prior Publication Data

US 2004/0195832 A1 Oct. 7, 2004

(30) Foreign Application Priority Data

Feb. 17, 2003 (JP) ............................. 2003-038398

(51) Int. Cl.
*H01B 7/06* (2006.01)
(52) U.S. Cl. .................... 174/69; 174/74 A; 248/92
(58) Field of Classification Search ................ 248/91, 248/92, 93, 53, 57, 56, 61; 174/72 A, 74 A, 174/69, 95, 99 R, 21 R, 21 JS, 21 JR, 36, 174/70 R, 71 R, 72 C; 439/181, 939, 86; 474/206, 207, 209

See application file for complete search history.

(56) References Cited

U.S. PATENT DOCUMENTS

| | | | | |
|---|---|---|---|---|
| 4,833,876 A | * | 5/1989 | Kitao et al. .................. 59/78.1 |
| 5,108,350 A | * | 4/1992 | Szpakowski ................. 474/207 |
| 5,638,672 A | * | 6/1997 | Furukawa .................... 59/78.1 |
| 5,881,548 A | * | 3/1999 | Takahashi et al. ........... 59/78.1 |
| 6,688,096 B2 | * | 2/2004 | Wada et al. .................. 59/78.1 |
| 6,695,014 B2 | * | 2/2004 | Blase .......................... 138/120 |
| 6,864,425 B2 | * | 3/2005 | Ikeda et al. ................ 174/74 A |
| 2003/0092305 A1 | * | 5/2003 | Takeuchi ..................... 439/342 |
| 2003/0145575 A1 | * | 8/2003 | Mendenhall et al. .......... 59/78 |
| 2004/0103636 A1 | * | 6/2004 | Komiya ....................... 59/78.1 |

FOREIGN PATENT DOCUMENTS

JP P3157491 2/2001

* cited by examiner

*Primary Examiner*—Joseph Wujciak, III
(74) *Attorney, Agent, or Firm*—Woodling, Krost and Rust

(57) ABSTRACT

An improved cable or the like protection and guide device in which even if curling, strain and the like exist in a side plate after molding, static electricity can escape and the device can be produced at a reduced cost. In a cable or the like protection and guide device according to the present invention a plurality of link bodies (11) articulably connected to each other in the longitudinal direction in a state where a cable or the like (15) was inserted into the device, comprises a pair of side plates (21) disposed on both sides of the cable or the like and connecting rods (22, 23) respectively bridged on the bend or articulation outer peripheral side and on the bend or articulation inner peripheral side of the side plate. Each of the side plates slide-contacts a side plate of an adjacent link body. At least the side plate is made of a synthetic resin having conductivity and a conductive member (55) is provided in a slide contact portion between the side plates of the adjacent link bodies.

1 Claim, 3 Drawing Sheets

CABLE OR THE LIKE PROTECTION AND GUIDE DEVICE

This patent application includes a claim of foreign priority to prior filed Japanese Patent Application 2003-038398 filed Feb. 17, 2003.

TECHNICAL FIELD TO WHICH THE INVENTION PERTAINS

The present invention relates to a cable or the like protection and guide device, and more specifically relates to a device which accommodates a cable or the like, such as a cable or a hose, which supplies a movable section of an industrial machine with electric power or energy of compression air and which guides and supports the cable or the like in a stable and reliable manner during the movement of the movable section.

RELATED ART

This kind of cable or the like protection and guide device has a structure that it has link bodies each comprising a pair of left and right side plates whose upper and lower edges were bridged therebetween, side plates of adjacent link bodies are overlapped in a width direction of the link body and pivotably connected therebetween, a flexible accommodation space is formed in connected link bodies, a linear position maintaining stopper of one of the pair of link bodies in adjacent pairs of link bodies is formed, a linear position maintaining stopper surface, which allows the linear position maintaining stopper to abut on the other pair of link bodies in the adjacent pairs of link bodies, is formed, a bend or articulation position limiting stopper for limiting the bend or articulation of adjacent link bodies is formed in the adjacent link bodies, and a bend or articulation position limiting stopper surface, which abut on the bend or articulation position limiting stopper, is formed in the side plates of the other link bodies in the adjacent link bodies.

The cable or the like is inserted into a flexile accommodation space formed by connected link bodies. When a link body is pivoted in a certain direction, a bend or articulation position limiting stopper surface contacts a bend or articulation position limiting stopper to limit a bend or articulation angle to a certain angle. Then when the link body is pivoted in the reverse direction to be in a linear position, a linear position limiting stopper contacts a linear position limiting stopper surface so that further pivoting is blocked. See, for example patent reference 1, U.S. Pat. No. 3,157,491.

Problems to be Solved by the Invention

In such a cable or the like protection and guide device, a link body is composed of a synthetic resin, and since the side plates of adjacent link bodies always slide contacts each other during operation and a cable or the like slide contacts side plates, considerable static electricity is generated. In order that the link bodies are not charged by such static electricity, it is necessary to contain an antistatic agent in a synthetic resin forming link bodies during molding, and to ground the link bodies to an earth connected to a part of the cable or the like protection and guide device.

The side plates are liable to generate shrinkage during molding and curing and strain after molding, and when an antistatic agent is contained in the resin of the raw material of the side plates, these defects are further increased. When link bodies are connected to each other such shrinkage, curing, strain or the like blocks uniform contact between side plates of the adjacent link bodies to decrease slide contact area between the side plates. When the slide contact area is decreased, static electricity is difficult to escape to the ground through a side plate and remains in the side plates. Then the remained static electricity suddenly discharges to break peripheral equipment. By maintains the slide contact area between the side plates constant by enhancing molding accuracy and enhancing the inspection standard the static electricity charge of the side plate can be minimized. However, yield of product is reduced and the production cost is remarkably increased.

The object of the present invention is to provide an improved cable or the like protection and guide device in which even if curling, strain and the like exist in side plated after molded, static electricity can be surely escaped and the device can be produced at a reduced cost.

Means for Solving the Problems

To attain the above-mentioned object a cable or the like protection and guide device according to the present invention in which a plurality of link frame bodies articulably connected to each other in the longitudinal direction in a state where said cable or the like was inserted into said device, comprises a pair of side plates disposed on both sides of said cable or the like and connecting rods respectively bridged on the bend or articulation outer peripheral side and on the bend or articulation inner peripheral side of said side plate, and in which each of said side plates slide-contacts a side plate of an adjacent link body, is characterized in that at least said side plate is made of a synthetic resin having conductivity and a conductive member is provided in a slide contact portion between the side plates of said adjacent link bodies.

Action

In the cable or the like protection and guide device according to the present invention, in which a plurality of link frame bodies articulably connected to each other in the longitudinal direction in a state where said cable or the like was inserted into said device, comprises a pair of side plates disposed on both sides of said cable or the like and connecting rods respectively bridged on the bend or articulation outer peripheral side and on the bend or articulation inner peripheral side of said link plate, and in which each of said side plates slide-contacts a side plate of an adjacent kink body, at least said side plate is made of a synthetic resin having conductivity and a conductive member is provided in a slide contact portion between the side plates of said adjacent link bodies. Thus, even if the adjacent side plates of the respective link bodies are slid by bending or articulation to be charged, the static electricity is escaped through adjacent side plates and further through a conductive member to the side plates of the adjacent link bodies, and then it is escaped to the ground connected to a part of the cable or the like protection and guide device so that the respective link bodies are not charged. Further, even if a side plate of each link body does not contact the side plate of the adjacent link body uniformly due to shrinkage during molding or curling or strain after molding, the conductive member of each link body always causes the static electricity to escape to the side plates of the adjacent link bodies whereby the respective link bodies are not charged.

The invention will be better understood when reference is made to the BRIEF DESCRIPTION OF THE DRAWINGS, DETAILED DESCRIPTION OF THE INVENTION and CLAIMS which follow hereinbelow.

A better understanding of the invention will be had when reference is made to the DETAILED DESCRIPTION OF THE INVENTION and CLAIMS which follow hereinbelow.

DETAILED DESCRIPTION OF THE INVENTION

Embodiments of the Invention

In an embodiment of the present invention, a side plate has a pin on a slide contact portion of the plate and the side plate of the adjacent link body has a pin hole. The respective link bodies are connected to fit the pin to the pin hole. A conductive member is formed in a flat plate and is incorporated in each of side plates around the pin.

In such a cable or the like protection and guide device, adjacent link bodies in respective link bodies are slid by bending or articulation, and if they are charged, static electricity is escaped through the side plate and the conductive member to the side plate of the adjacent link plate. Then the static electricity is escaped to the ground connected to a part of this cable or the like protection and guide device so that the respective link bodies are not charged. Further, even if a side plate of each link body does not contact the side plate of the adjacent link body uniformly due to shrinkage during molding or curling or strain after molding, the conductive member of each link body always causes the static electricity to escape to the side plates of the adjacent link bodies whereby the respective link bodies are not charged.

An example of a cable or the like protection and guide device according to the present invention will be described with reference to drawings below.

Figure 1:
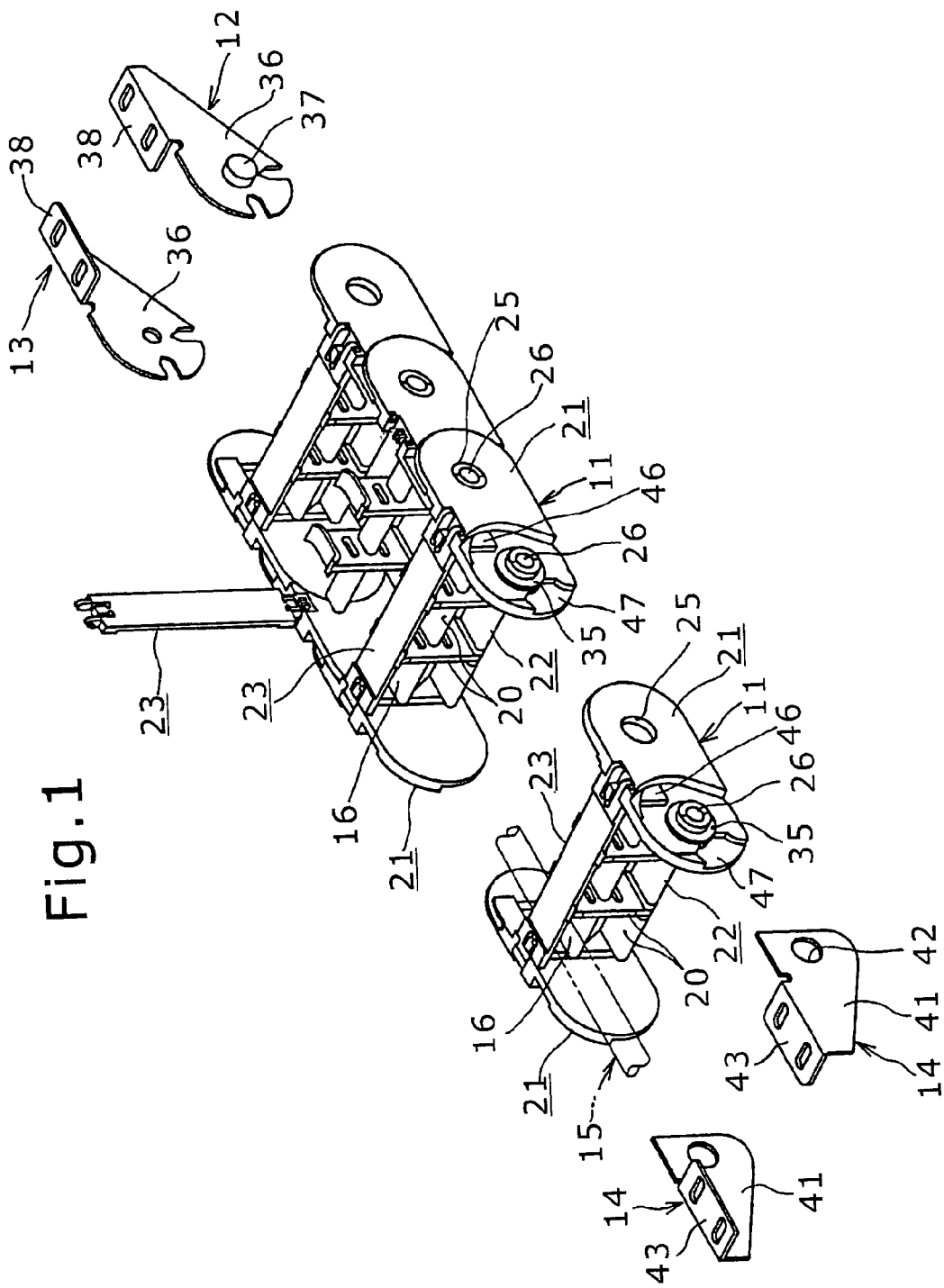
FIG. 1 is an exploded perspective view showing one example of a cable or the like protection and guide device according to the present invention.

This cable or the like protection and guide device is composed of a structure in which a cable or the like 15 is accommodated in an open state, as shown in FIG. 1.

This cable or the like protection and guide device includes link bodies 11, movable end fitting 12 and fixed end fitting 14. The link bodies are arranged in a row and are pin-connected to the adjacent link bodies 11. The movable end fitting 12 is connected to an front end of the connected link bodies and the fixed end fitting 14 is connected to a rear end thereof. The cable or the like 15 is accommodated in a tunnel formed by the inside space of the link bodies 11.

Each link body 11 comprises a side plate 21 and connecting rods 22 and 23. Side plates 21 are arranged with a space in parallel with each other. One connecting rod (hereinafter referred to as an inside connecting rod to be differentiated from the other connecting rod 23) is arranged between side plates 21 so as to bridge bending or articulation inner peripheral sides of the side plates 21. The inside connecting rod 22 is composed of a synthetic resin injection-molded product with the side plate 21, and the inside connecting rod 22 and the side plate 21 are integrally molded. The other connecting rod 23 (hereinafter referred to as an outside connecting rod) is also composed of a synthetic injection-molded product, and is arranged between side plates 21 so as to bridge bending or articulation outer peripheral sides of the side plates 21. This outside connecting rod 23 is detachably attached to the side plate 21.

The side plate 21 has a shape of a cocoon when viewed from the side. A width between the inner sides of front side plates is slightly larger than a width between the outer sides of rear side plates.

Front outer sides of the side plates 21 have pin holes 25. On the other hand, rear ends of the side plates 21 are provided with pins 26 each having a diameter corresponding to the pin hole 25.

Figure 4:
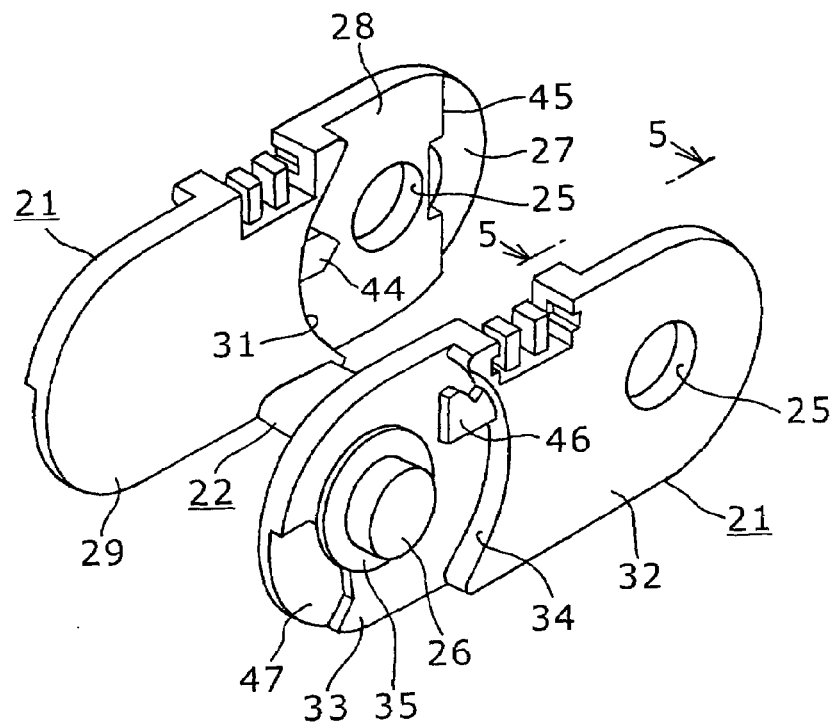
FIG. 4 is a perspective view of link plates and a connecting rod in the connecting member forming the cable or the like protection and guide device shown in FIG. 1.
Figure 5:
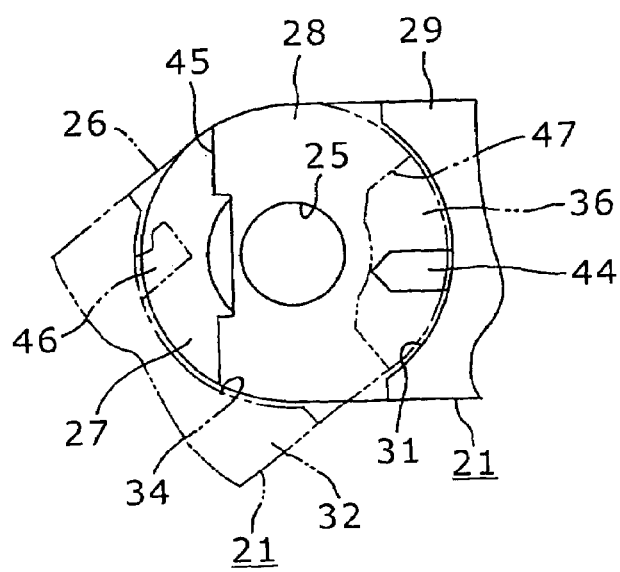
FIG. 5 is a partially omitted side view of the connecting members taken along the line 5—5 of FIG. 4.

A front inner side of the side plate 21 are provided with step walls 27 to 29 as shown in FIGS. 4 and 5. A front edge of the step wall 29 forms a partial cylindrical surface or an arc surface 34, which has a central axis coaxially with the pin hole 25. A rear outer side of the side plate 21 are provided step walls 32 and 33. A rear edge of the step wall 32 forms a partial cylindrical surface or an arc surface 34, which has a central axis coaxially with the pin hole 26.

Figure 3:
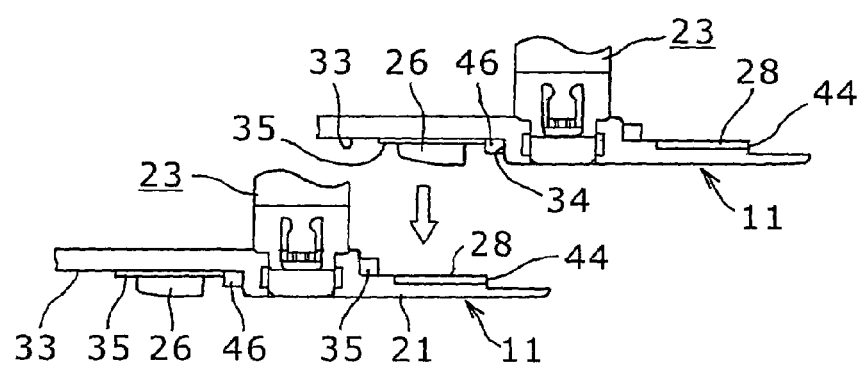
FIG. 3 is a partially omitted plan view showing a connecting state of the connecting members forming the cable or the like protection and guide device shown in FIG. 1.

The respective link bodies 11 are connected to each other, as shown in FIG. 3, by fitting step walls 33 to the step walls 33 of the front adjacent link bodies 11, and fitting a pin hole 25 to the pin 26 of the front adjacent link body 11, and by fitting step walls 33 to the step walls 33 of the rear adjacent link bodies 11, and fitting a pin 26 to the pin hole 25 of the rear adjacent link body 11. Thus, each link body can be pivoted or articulated about the pin 26 with respect to the adjacent link body 11.

The cable or the like 15 is arranged in a tunnel formed by the respective split spaces formed in the inside space 16 by parting members 20 arranged between the side plates 21. The incorporation of a cable or the like 15 is performed for example by opening the outside connecting rods 23 of all link bodies 11, inserting the cable or the like 15 into the tunnel and closing the outside connecting rods 23.

In this cable or the like protection and guide device, the side plates 21 and the inside connecting rods 22 are composed of synthetic resin molded products as descried above. The synthetic resin molded products consist of conductive synthetic resin molded products containing a conductive material such as carbon fiber. Since the respective side plates 21 connect side plates of adjacent link plates 11, the link bodies 11 electrically connect to each other in a connected state.

Figure 2:
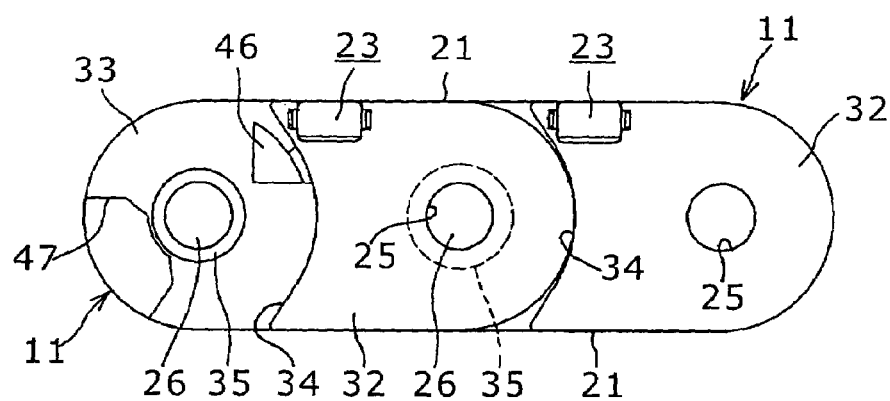
FIG. 2 is a side view of connecting members forming the cable or the like protection and guide device shown in FIG. 1.

In the respective link bodies 11, as shown in FIGS. 2 to 4, a conductive member is incorporated in a slide contact portion between adjacent link bodies 11. The conductive member is denoted by a reference numeral 35. The conductive member 35 itself has a ring form and is manufactured by for example press working a metal sheet. This conductive member 35 is fitted on a pin 26 of the side plate 21, which forms the respective link bodies 11. The incorporation of the conductive member 35 is performed by slightly protruding a surface of the conductive member 35 from a surface of the side plate 21 and insert-molding the conductive member 35 together with the side plate 21 and the inside connecting rod 22. When adjacent link bodies are connected to each other, the outer surface of each conductive member 35 is brought into contact with a surface of the step wall 33 of the adjacent link body 11.

This cable or the like protection and guide device is used as a cable or the like protection and guide device, which connects a horizontal boring machine with an attachment. The cable or the like 15 is a power source cable, which connects a motor on a main shaft head, with a power unit or a hose, which connects a coolant nozzle on the main shaft head, with a coolant tank.

A movable end fitting 12 has an L-shape as shown FIG. 1, and is composed of the same material as that of the link body 11. A pin 37 on a mounting piece 36 is fitted into a pin hole 25 on a side plate 21 of the link body 11 on one end of a row of link bodies, and a fixed piece 38 is bolt-fastened to a main shaft head. A fixed end fitting 14 has also an L-shape as shown FIG. 1, and is composed of the same material as that of the link body 11. A pin hole 42 in a mounting piece 41 is fitted on a pin 26 on a side plate 21 of the link body 11 on the other end of a row of link bodies, and a fixed piece 43 is bolt-fastened to a horizontal boring machine or a column.

The grounding is performed by connecting the fixed end fitting 14 to a ground of the power source unit or a ground designed for exclusive use.

When the main shaft head is moved link bodies are linearly moved and are bent or articulated in accordance with the stroke so that a length of the cable or the like 15 is adjusted. Then a side plate 21 and the side plate 21 of the adjacent link body rub against each other so that static electricity is generated. However, since the respective link bodies 11 are composed of conductive synthetic resin, the static electricity can be escaped from the fixed end fitting to the ground through the adjacent link bodies 11.

Further, even if a contact area between the link body 11 and the adjacent link body 11 is decreased by shrinkage during molding and strain or curling after molding, since the conductive member 35 contacts a step wall 33 on the side plate 21 of the adjacent link body 11 so that a link body 11 and the adjacent link body are always electrically brought into contact with each other, static electricity can be surely escaped through the fixed end fitting 14.

Further, since the conductive member 35 is a metal plate having a flat surface and the hardness of the conductive member 35 is harder than that of the side plate 21 composed of a synthetic resin, even if the surface of the side plate 21 is rough, the surface of the side plate wears and conforms with the conductive member 35 and the bending or articulation resistance of the link body 11 is small. Therefore, the side plates 21 of the link bodies 11 are always smoothly bent or articulated and noise due to sliding of side plates is reduced.

Further, since the conductive member 35 is positioned between side plates 21 of adjacent link bodies 11 and is not exposed outside, it is difficult to rust and soil is difficult to be attached to the conductive member 35, the conductivity can be maintained for a long period of time.

Further, since the conductive member 35 is composed of a punched work piece of a metal sheet and the incorporation of the conductive member 35 to the link body 11 can be performed by insert molding, the effect of the conductive member 35 can be obtained at a low cost without changing manufacturing steps significantly.

It is noted that a mechanism for restricting a bending or speculation angle or a rotational angle is incorporated in each link body 11 in an operation of the cable or the like protection and guide device. This mechanism has the same configuration as described in the specification of Japanese patent No. 3157491. The mechanism itself comprises an arrow-shaped protrusion 44 and a flat restricting surface 45 provided on a step wall 28, which forms a front inner surface of the side plate 21 of each link body 11, and a hook-shaped protrusion 46 and a fan-shaped recess 47, which form a rear end outer surface of the side plate 21.

When each link body 11 is connected to the adjacent link body 11, the protrusion 44 contacts one end of the recess 47 of a front link body 11, and the protrusion 46 contacts the restricting surface 45 of the front link body 11. A front link body 11 is articulated about the pin 26 as shown in FIG. 5, the restricting surface 45 is spaced apart from the protrusion 46 of the front link body 11, and the protrusion 44 slides on the recess 47 of the front link body 11 to contact the opposite portion of the recess 47. The rotational angle or the bending angle in the front link body 11 is restricted by this contact. Further, when the front link body 11 is pivoted about the pin 26 in the opposite direction, the protrusion 44 slides on the recess 47 of the front link body 11 to contact the original portion of this recess 47. Thus, the restricting surface 44 contacts the protrusion 46 of the front link body 11 so that the front link body 11 is prevented from being bent or articulated over the linear state.

In the example described above, the conductive member 35 is composed of a metal sheet. However, it may be composed of other materials having conductivity.

Alternatively, the arrangement of the conductive member 35 may be only around the pin hole 25 or around both the pin 26 and the pin hole if necessary.

Further, although the conductive member 35 is circular ring-shaped, it may be of other shapes such as an oval ring, a polygonal ring and the like. Alternatively, it may form with a plurality of portions and may be arranged around the entire pin 26 or around a part of the pin 26, or may be arranged around the entire pin hole 25 or a part of the pin hole 25.

The link body 11 comprising the side plates 21 and the outside and inside connecting rods 22, 23 is composed of a carbon fiber-containing synthetic resin. However, it may be a synthetic resin containing other conductive particles such as metallic powder and the like, or may be a conductive synthetic resin. Although the entire link body 11 is composed of a conductive synthetic resin, only the side plates 21 may be a conductive synthetic resin in accordance the structure.

The cable or the like protection and guide device of the present invention has a structure that the link bodies 11 are pin-connected to each other, that is a pin 26 of each link body 111 is fitted to a pin hole of the front adjacent link body, and a pin hole 25 is fitted on a pin of the rear adjacent link body. However, the present invention is not limited to such a structure and can adopt other structures.

Effects of the Invention

As mentioned above, in the cable or the like protection and guide device according to the present invention, in which a plurality of link frame bodies articulably connected to each other in the longitudinal direction in a state where said cable or the like was inserted into said device, comprises a pair of side plates disposed on both sides of said cable or the like and connecting rods respectively bridged on the bend or articulation outer peripheral side and on the bend or articulation inner peripheral side of said link plate, and in which each of said side plates slide-contacts a side plate of an adjacent kink body, at least said side plate is made of a synthetic resin having conductivity and a conductive member is provided in a slide contact portion between the side plates of said adjacent link bodies. Thus, even if the adjacent side plates of the respective link bodies are slid by bending or articulation to be charged, the static electricity is escaped through adjacent side plates and further through a conductive member to the side plates of the adjacent link bodies, and then it is escaped to the ground connected to a part of the cable or the like protection and guide device so that the respective link bodies are not charged. Further, even if a side plate of each link body does not contact the side plate of the adjacent link body uniformly due to shrinkage during molding or curling or strain after molding, the conductive member of each link body always causes the static electricity to escape to the side plates of the adjacent link bodies whereby the respective link bodies are not charged. Thus, even if a shrinkage during molding or curing and strain after molding be generated in the side plates, a cable or the like protection and guide device having no static electricity charging can be manufactured at low costs.

DESCRIPTION OF REFERENCE NUMERALS

11 . . . Link body
12 . . . Movable end fitting
14 . . . Fixed end fitting
15 . . . Cable or the like
16 . . . inside space
21 . . . Side plate
22, 23 . . . Connecting rod
25 . . . Pin hole
26 . . . Pin
35 . . . Conductive member The invention has been described by way of examples only and those skilled in the art will readily recognize that certain changes and modifications may be made to the examples without departing from the spirit and scope of the appended claims.

We claim:

1. A cable or hose protection and guide device in which a plurality of link bodies are articulably connected to each other in the longitudinal direction, each of said link bodies each being connected to adjacent link bodies, said cable residing in said plurality of link bodies, each of said link bodies comprises a pair of side plates and a pair of connecting rods, each of said side plates includes an outer peripheral side and an inner peripheral side, one of said connecting rods of each said link body bridges said inner peripheral side and the other of said connecting rods bridges said outer peripheral side, each of said side plates of each of said link bodies slidingly engages a respective side plate of an adjacent link body, characterized in that: said side plates are made of an electrically conductive synthetic resin; each of said side plates includes a metal conductive member and a slide contact portion; said slide contact portions of said slide plates of said adjacent link bodies interengage each other; each of said side plates includes a pin and a pin hole; each of said link bodies is connected by fitting said pin of said side plate to said pin hole of said adjacent side plate; and, said metal conductive member of each of said side plates is formed in a plate shape and is incorporated around said pin and said pin hole.

* * * * *

UNITED STATES PATENT AND TRADEMARK OFFICE
CERTIFICATE OF CORRECTION

PATENT NO. : 7,211,730 B2
APPLICATION NO. : 10/705038
DATED : May 1, 2007
INVENTOR(S) : Ikeda et al.

It is certified that error appears in the above-identified patent and that said Letters Patent is hereby corrected as shown below:

Column 6, line 46, delete "111" and insert -- 11--.

Column 1, line 49, delete "United States" and insert -- Japanese--.

Column 4, line 26, delete "26" and insert -- 25--.

Signed and Sealed this

Twenty-sixth Day of June, 2007

JON W. DUDAS
*Director of the United States Patent and Trademark Office*